United States Patent [19]

Schleicher

[11] Patent Number: 4,919,005

[45] Date of Patent: Apr. 24, 1990

[54] DEVICE FOR ACTUATING AN INCOMPRESSIBLE DRIVE CABLE

[75] Inventor: Bernd Schleicher, Munich, Fed. Rep. of Germany

[73] Assignee: Webasto AG Fahrzeugtechnik, Gauting, Fed. Rep. of Germany

[21] Appl. No.: 326,725

[22] Filed: Mar. 21, 1989

[30] Foreign Application Priority Data

Mar. 24, 1988 [DE] Fed. Rep. of Germany ....... 3809949

[51] Int. Cl.⁵ .......................... F16C 1/10; B60J 7/057
[52] U.S. Cl. .................... 74/501.6; 74/500.5; 74/502.4; 74/502.6; 296/223
[58] Field of Search .................. 74/764, 89.17, 89.18, 74/422 X, 501.6, 557, 551.7, 500, 500.5, 501.5 R, 502.6, 502.4; 296/223 X

[56] References Cited

U.S. PATENT DOCUMENTS

| 3,266,328 | 8/1966 | Rott ..................................... 74/501.6 |
| 4,162,805 | 7/1979 | Hirschberger ..................... 296/223 |
| 4,272,125 | 6/1981 | Bienert et al. ..................... 296/223 |
| 4,317,505 | 3/1982 | Schneider ......................... 74/502.5 X |
| 4,390,203 | 6/1983 | Lutz et al. ........................... 296/223 |
| 4,567,692 | 2/1986 | Vogt et al. ....................... 296/223 X |
| 4,651,594 | 3/1987 | Vogel et al. ..................... 296/223 X |
| 4,659,140 | 4/1987 | Fuerst et al. ........................ 296/223 |

FOREIGN PATENT DOCUMENTS

| 166316  | 12/1949 | Austria ................................. 74/502 |
| 623786  | 7/1961  | Canada ............................... 296/223 |
| 1650918 | 2/1971  | Fed. Rep. of Germany . |
| 2135803 | 1/1973  | Fed. Rep. of Germany . |
| 1206740 | 2/1975  | Fed. Rep. of Germany . |
| 3708635 | 9/1987  | Fed. Rep. of Germany ...... 296/223 |
| 346648  | 2/1937  | Italy ................................. 74/502.5 |
| 59-48228| 3/1984  | Japan ................................. 74/557 |
| 1184268 | 3/1970  | United Kingdom . |

Primary Examiner—Vinh T. Luong
Attorney, Agent, or Firm—Sixbey, Friedman, Leedom & Ferguson

[57] ABSTRACT

Device for actuating at least one helically threaded, incompressible drive cable, which is axially movable, having a drive pinion seated on a drive shaft, and a cable guideway for guiding the drive cable in the area of the drive pinion. For the purpose of noise reduction, boundary edges of the cable guideway contacting the drive cable are of a configuration such that they form an angle with the longitudinal axis of the drive cable which deviates from 90 degrees; whereby an acute approach angle enclosed between the boundary edges of the cable guideway and the sections of the turns of the helical thread facing them, is larger than an acute elevation angle which is enclosed between the helical turns and a vertical plane which extends perpendicular to the longitudinal axis of the drive cable.

10 Claims, 2 Drawing Sheets

DEVICE FOR ACTUATING AN INCOMPRESSIBLE DRIVE CABLE

BACKGROUND OF THE INVENTION

The invention relates to a device for actuating at least one helically threaded incompressible drive cable that is axially movable for use in the displacement of a movable part in a vehicle body. More particularly, wherein a drive pinion seated on a drive shaft is provided for displacement of the cable and a cable guideway is provided for guiding the drive cable in the area of the drive pinion.

Different designs for this type of device are known (see, for example, German Pat. Nos. 12 06 740 and 21 35 803, British Pat. No. 1,184,268, and U.S. Pat. No. 4,659,140). One feature that these known actuating devices have in common is that the boundary edges of the cable guideway, that contact the threaded cable, form a 90 degree angle with respect to the longitudinal axis of the drive cable. A continual quality problem with such actuating devices, which have performed satisfactorily, is the occurrence of troublesome noises during displacement of the drive cable.

SUMMARY OF THE INVENTION

The invention, therefore, has a primary objective to provide an actuating device, of the kind described, in which the production of noise is diminished.

According to preferred embodiments of the invention, this objective is achieved in that the boundary edges, of the cable guideway that contacts the guide cables form an angle with the longitudinal axis of the drive cable that is less than 90 degrees while, at the same time, an acute approach angle that is enclosed between the boundary edges of the cable guideway and those parts of the helical turns of the cable which face them, is larger than an acute elevation angle, enclosed by the turns of the helical thread of the cable relative to a plane which extends normal to the longitudinal axis of the drive cable.

The invention is based on the discovery that troublesome noises in the actuating devices of the kind described above are essentially caused by the boundary edges of the cable guideway as turns of the drive cable thread begin to run along the guideway, and the realization that the inventive design of the cable guideway boundary edges can counter these drawbacks most effectively. The inventive solution to the existing problem, in particular, results in a uniform and backlash free run-in of the helical thread in the cable guideway, with the consequence of a substantial resultant noise reduction.

Preferably, the boundary edges of the cable guideway extend counter to the helical pitch with respect to the longitudinal axis of the drive cable, and are inclined by an angle which is smaller than 90 degrees. Moreover, in another preferred embodiment, the angle enclosed by the boundary edges of the cable guideway and those portions of the turns of the helical thread facing them, is at least twice as large as the elevation of the helix angle.

The cable guideway ay have a conventional U-shaped cross section (German Application No. 21 35 803 and U.S. Pat. No. 4,659,140) or, alternatively, may have an inverted U-shaped cross section (German Pat. No. 12 06 740), or may have a tubular cross section (British Pat. No. 1,184,268).

The actuating device is particularly intended for the actuation of displaceable vehicle roof covers or adjustable vehicle windows.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
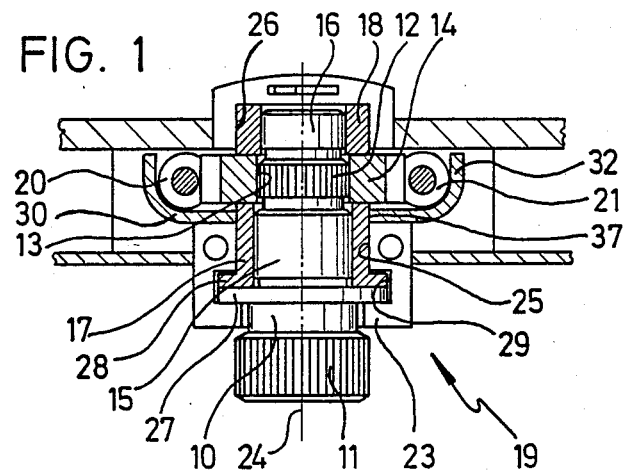
FIG. 1 is a sectional view through an actuating mechanism taken along line I—I of FIG. 2.

The actuating device depicted in FIGS. 1 to 4 has a drive shaft 10 with a toothed head 11. A hand crank, not depicted, can be fitted over head 11. Head 11 also can be designed to provide a meshing engagement with an output gear of a motor drive. An outer toothing 12 of drive shaft 10 engages an inner toothing 13 of a drive pinion 14, that is fitted onto drive shaft 10, to provide a torsional connection between drive shaft 10 and pinion 14.

Cylindrical sections 15 and 16 of drive shaft 10 are rotatably supported in a bearing housing 19 via bushings 17 and 18, respectively. Drive pinion 14 transfers drive force to two incompressible, axially movable drive cables 20 and 21 that are kept in meshing engagement with the diametrally opposite sides of drive pinion 14. Bearing housing 19 is divided into two identical bearing housing halves 22 and 23, along a plane that extends through the longitudinal axis 24 of drive shaft 10 transversely to the longitudinal axis of drive cables 20 and 21. The two bearing housing halves 22 and 23 form a main bearing 25 that accommodates the first bushing 17, as well as a counter bearing 26 for accommodating the second bushing 18.

Drive shaft 10 has a radially projecting annular flange 27. Flange 27, together with a radially projecting annular flange 28 of bushing 17, engages corresponding recesses 29 of bearing halves 22 and 23.

A cable guideway 30 is fitted, with play, onto drive shaft 10. The cable guideway 30 consists of a metal sheet, which, as viewed in FIG. 1, has a U-shaped configuration. Guide walls 32 are formed at diametrally opposite sides of a base plate 31 of guideway 30 so as to extend essentially parallel to longitudinal axis 24 and normal to the longitudinal axis of the drive shaft 10. The guide walls 32 extend transversely outwardly from base plate 31 with a curvature that is adapted to the outer diameter of drive cables 20 and 21. The guide walls 32 are transversely distanced from drive pinion 14 so as to maintain drive cables 20, 21 in secure engagement with the external toothing of drive pinion 14 (FIG. 1).

Figure 2:
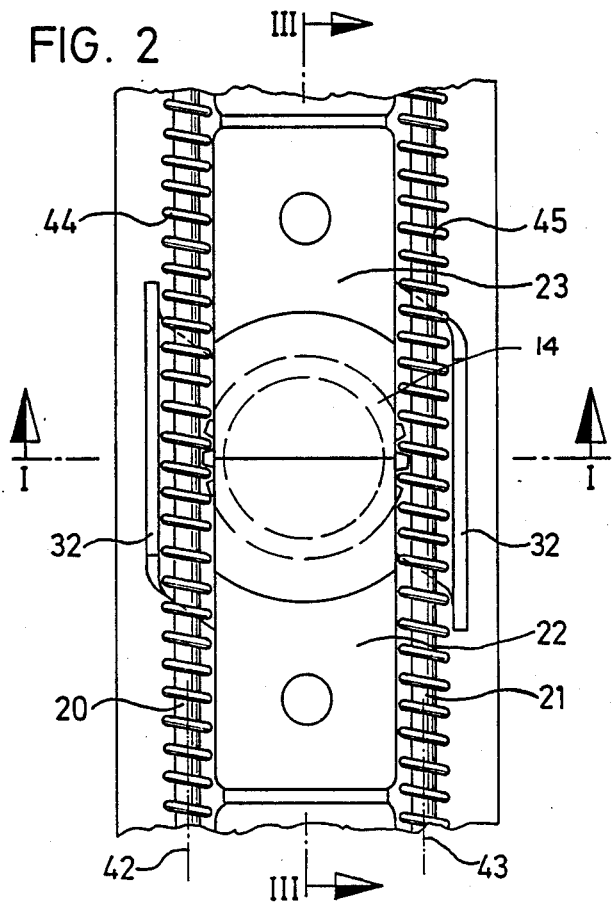
FIG. 2 is a top view onto the actuating mechanism according to FIG. 1.
Figure 3:
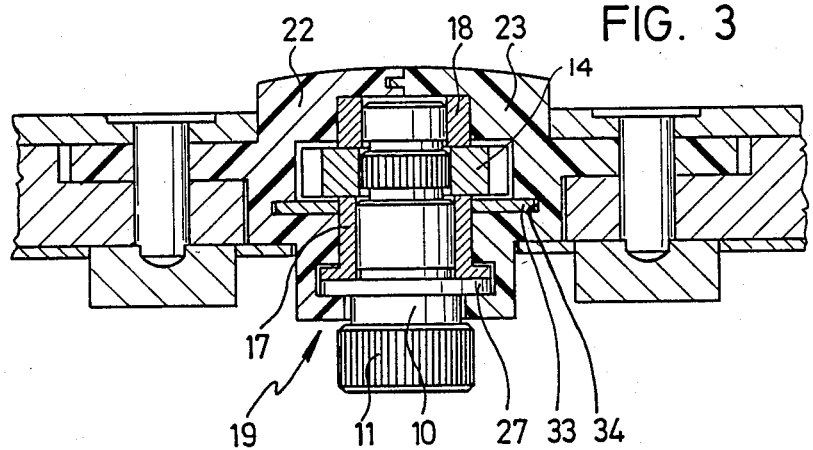
FIG. 3 is a sectional view taken along line III—III of FIG. 2.

Between the guide walls 32, the base plate 31 has partially circular sections 33 that engage an additional recess 34 of bearing housing halves 22 and 23. At a transition point of the circular section 33 of base plate 31 to each of the guide walls 32, a respective bearing surface 36 is formed which extends parallel to guide walls 32, and together the bearing surfaces 36 serve to give support to the cable guideway 30 at diagonally diametrally opposite side areas 37 of bearing housing halves 22 and 23 (FIG. 2). In this manner, a positive connection is obtained between cable guideway 30 and the two bearing housing halves 22 and 23, fixing cable guideway 30 in an axial direction and preventing it from twisting relative to bearing housing 19.

Figure 4:
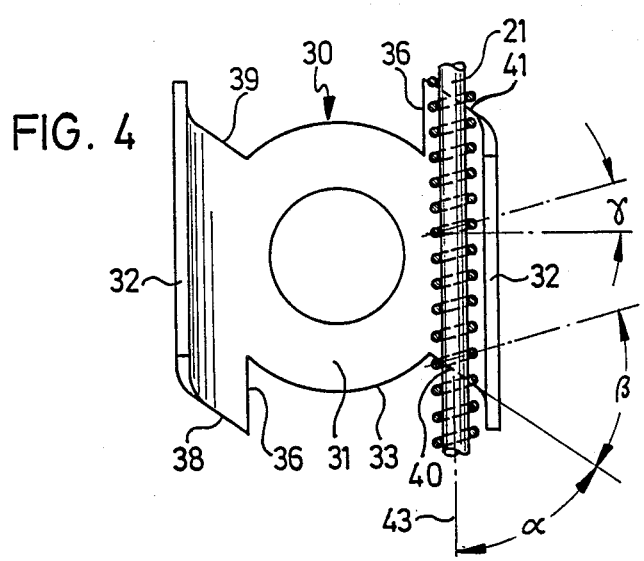
FIG. 4 is a top view onto the cable guideway of the actuating mechanism, in accordance with FIGS. 1 to 3, as well as one drive cable.

As particularly shown in FIG. 4, cable guideway 30 has boundary edges 38, 39 which contact drive cable 20, and has boundary edges 40, 41 which contact drive cable 21; these boundary edges being sloped relative to the longitudinal axis 42 and 43 of drive cables 20, 21. In the preferred embodiment depicted, the downward slope of boundary edges 38–41 extends counter to the upward pitch of the helical turns 44, 45 of drive cables 20, 21, with respect to those sections of the helical turns that are facing the boundary edges; whereby a slope angle $\alpha$ is formed, between the boundary edges 38–41 and the longitudinal axis 42, 43 of the drive cables 20, 21, which is smaller than 90 degrees. Regardless of whether the boundary edges of the cable guideway, as depicted, are sloped counter to the helical upward pitch of the helical turns or are sloped in the same direction as the helical pitch, slope angle $\alpha$, in any case, deviates from a 90 degree angle and is selected such that an acute approach angle $\beta$, enclosed between the boundary edges 38–41 of cable guideway 30 and those sections of the helical turns facing them, is larger than an acute elevation angle $\gamma$, enclosed between the helical turns and a vertical plane that extends perpendicularly relative to the longitudinal axis of the drive cables. Preferably, approach angle $\beta$ is at least twice as large as elevation angle $\gamma$ of helical turns 44, 45.

The inventor has found that the described simple measure of skewing the boundary edges 38–41 results in a substantial noise reduction in the operation of the actuating mechanism. Generally speaking, the noise reduction effect is increased with an increasingly larger approach angle $\beta$, i.e., in the FIG. 4 embodiment with a decreasingly smaller slope angle $\alpha$.

Figure 5:
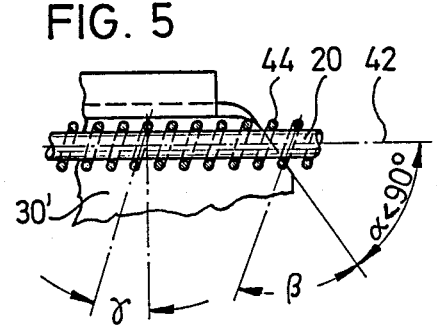
FIG. 5 is a partial top view onto a drive cable and a portion of a cable guideway, in accordance with a modified embodiment of the present invention.
Figure 6:
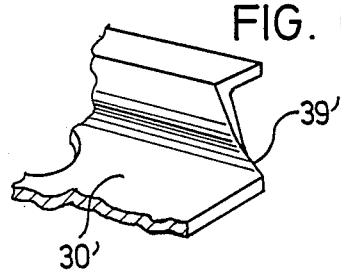
FIG. 6 is a perspective partial view of the cable guideway in accordance with FIG. 5.

In the modified embodiment according to FIGS. 5 and 6, the helical turns 44 of drive cable 20 are oriented in the opposite direction to that described in the embodiment according to FIGS. 1 to 4. Correspondingly, the boundary edge 39' of cable guideway 30' also is sloped in the opposite direction to that depicted in FIGS. 2 to 4.

While I have shown and described various embodiments in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the scope of the appended claims.

What is claimed:

1. Device for actuating at least one incompressible helically threaded drive cable, that is axially movable for displacing a movable part in a vehicle body, comprising a drive pinion seated on a drive shaft and a cable guideway for guiding the drive cable in proximity to the drive pinion, wherein the cable guideway has boundary edges that, in use, contact the drive cable and form a slope angle, with respect to a longitudinal axis of the drive cable, which is other than 90 degrees, and form an acute approach angle that is enclosed between said boundary edges of the cable guideway and sections of turns of the helical thread which face them, said approach angle being larger than an acute elevation angle that is enclosed between the turns of the helical thread and a plane which extends perpendicularly relative to the longitudinal axis of the drive cable.

2. Device according to claim 1, wherein the boundary edges of the cable guideway extend counter to the pitch of the turns of the helical thread, and are inclined with respect to the longitudinal axis of the drive cable by an amount which causes the slope angle to be smaller than 90 degrees.

3. Device according to claim 2, wherein the acute approach angle is at least twice as large as the elevation angle.

4. Device according to claim 1, wherein the acute approach angle is at least twice as large as the elevation angle.

5. In an actuating device for displacement of a movable part of a motor vehicle of the type having at least one incompressible helically threaded drive cable for drivingly acting on the movable part, a drive pinion seated on a drive shaft and engaging between successive turns of the helical thread, and a cable guideway for guiding the drive cable in proximity to the drive pinion, said cable guideway having boundary edges that contact the drive cable, the improvement for minimizing the production of noise due to movement of the drive cable relative to the cable guideway wherein said boundary edges form a slope angle, with respect to a longitudinal axis of the drive cable, which is other than 90 degrees, and form an acute approach angle that is enclosed between said boundary edges of the cable guideway and sections of turns of the helical thread which face them, said approach angle being larger than an acute elevation angle that is enclosed between the turns of the helical thread and a plane which extends perpendicularly relative to the longitudinal axis of the drive cable.

6. Device according to claim 5, wherein the boundary edges of the cable guideway extend counter to the pitch of the turns of the helical thread, and are inclined with respect to the longitudinal axis of the drive cable by an amount which causes the slope angle to be smaller than 90 degrees.

7. Device according to claim 6, wherein the acute approach angle is at least twice as large as the elevation angle.

8. Device according to claim 5, wherein the acute approach angle is at least twice as large as the elevation angle.

9. Device according to claim 5, wherein a pair of drive cables are provided, and wherein said cable guideway has a respective guide channel for each drive cable, the guide channels being formed on opposite sides of a base plate through which said drive pinion passes.

10. Device according to claim 9, wherein said base plate has partially circular sections that engage within a recess of a bearing housing for the drive shaft, and wherein each guide channel is formed with a respective bearing surface, the bearing surfaces extending parallel to said guide channels and being disposed at transition points from the circular sections of the base plate to the guide channels at diagonally opposite side areas of the bearing housing for fixing the cable guideway in an axial direction nd against twisting relative to the bearing housing.

* * * * *